United States Patent [19]
Coulbourn

[11] 3,874,339
[45] Apr. 1, 1975

[54] ANTI-PULL ANIMAL LEASH MECHANISM
[76] Inventor: John Coulbourn, R.D. 2, New Tripoli, Pa. 18066
[22] Filed: June 26, 1974
[21] Appl. No.: 483,939

[52] U.S. Cl.................................. 119/29, 119/106
[51] Int. Cl............................................ A01k 27/00
[58] Field of Search ............ 119/29, 106, 109, 107, 119/118, 206; 231/2 E

[56] References Cited
UNITED STATES PATENTS
| | | | |
|---|---|---|---|
| 2,023,950 | 12/1935 | Carter | 119/29 |
| 2,966,621 | 12/1960 | Voll | 231/2 E |
| 3,753,421 | 8/1973 | Peck | 119/29 |

Primary Examiner—Hugh R. Chamblee
Attorney, Agent, or Firm—Fred Fisher

[57] ABSTRACT

An anti-pull leash mechanism includes a collar for an animal (such as a dog), a device attached to the collar, and a leash for coupling to such device. When the animal pulls excessively on the leash, the device, by means of electric probes, provides electrical shocks to the animal, thus causing the animal to refrain from excessive pulling. The device includes a shock circuit and a spring actuated switch, so that, when the animal pulls excessively hard beyond a predetermined force, the spring actuated switch actuates the shock circuit to provide shocks to the animal.

7 Claims, 4 Drawing Figures

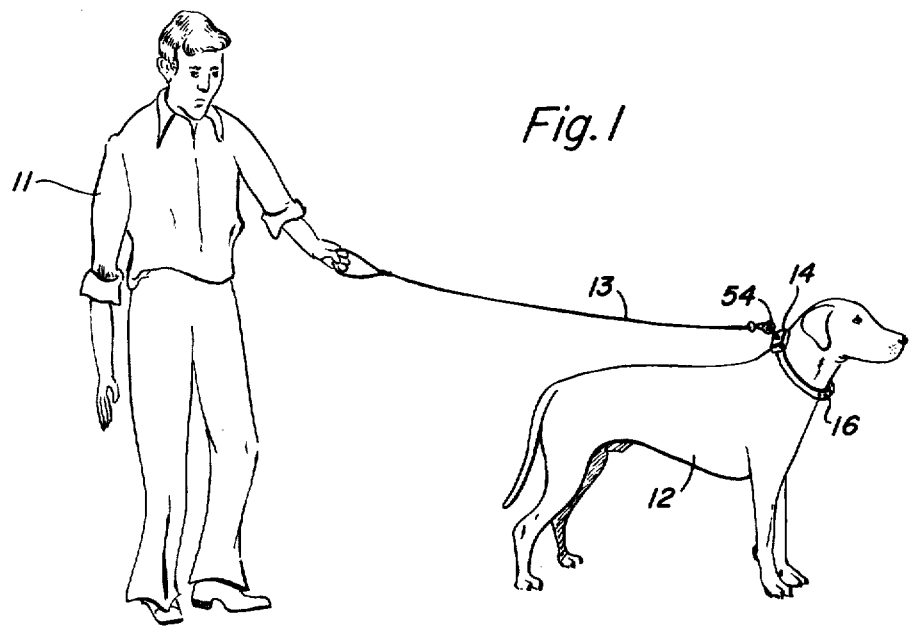
Fig. 1
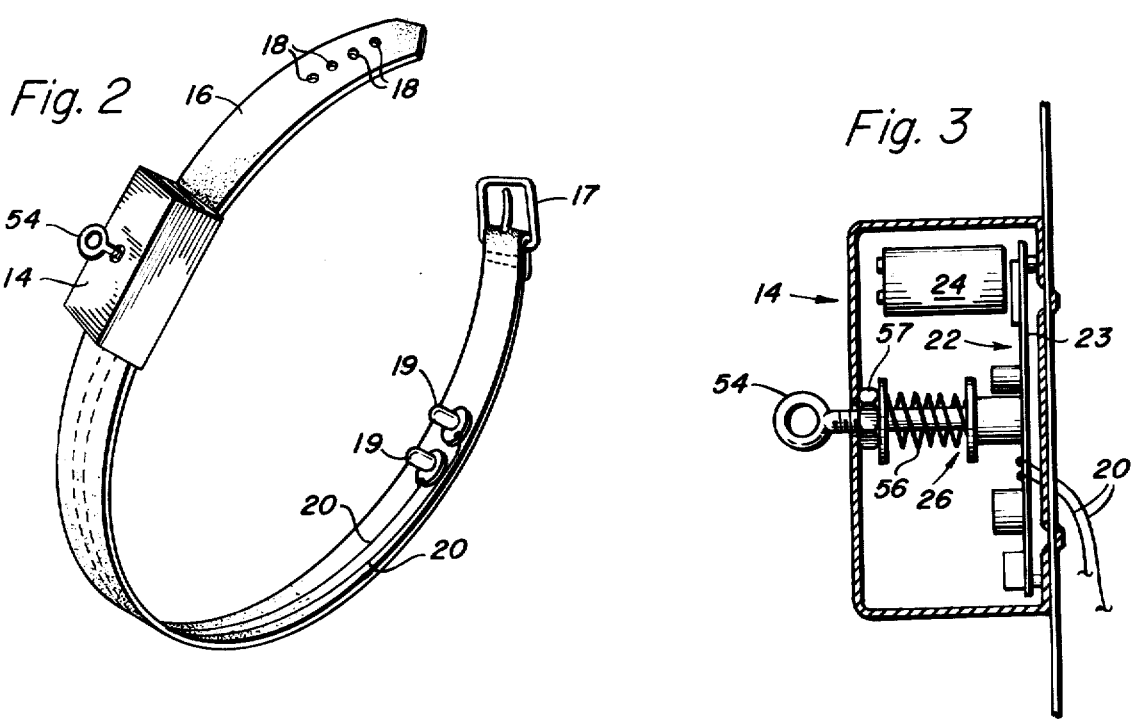
Fig. 2
Fig. 3
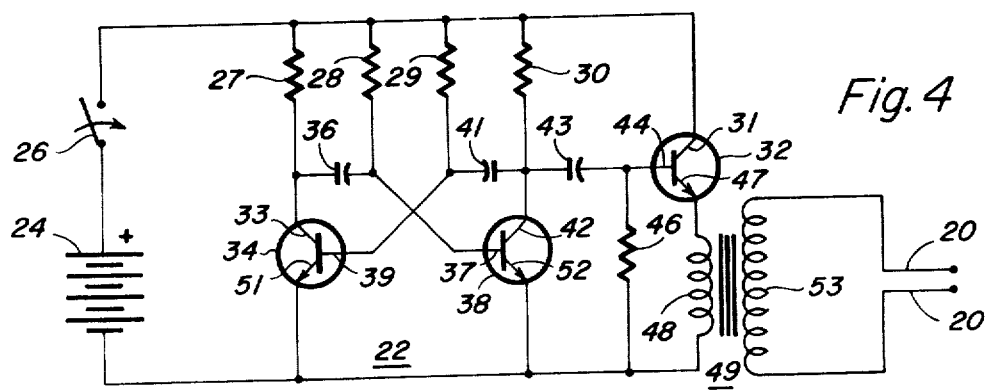
Fig. 4

ANTI-PULL ANIMAL LEASH MECHANISM

BACKGROUND OF THE INVENTION

1. Field of the Invention

This invention relates to a device which is suitable for attachment to an animal collar for preventing the animal from pulling excessively on a leash. More particularly, it relates to an anti-pull animal leash mechanism including an animal collar, a leash, and a device coupled to the leash and collar for producing electric shocks to the animal when the animal pulls at an excessive manner beyong a predetermined force. Accordingly, it is the general object of the invention to provide new and improved mechanisms and devices of such character.

2. Description of the Prior Art

In accordance with a preliminary novelty search performed on behalf of the inventor, the following United States and foreign patents were considered to be of interest.

U.S. Pat. No. 2,741,224 Putman
U.S. Pat. No. 2,800,104 Cameron et al.
U.S. Pat. No. 2,996,043 Pettingill
U.S. Pat. No. 3,589,337 Doss
U.S. Pat. No. 3,687,112 Henderson
U.S. No. Pat. 3,753,421 Peck
Swedish Pat. 113,556 Petersson The Swedish patent to Petersson shows a dog collar with electrical probes on the interior thereof. The probes are manually actuated by switch contacts 17', 17" in the leash handle. A power pack and shock circuitry are apparently carried by a person walking the dog.

Henderson, U.S. Pat. No. 3,687,112, shows a collar for a horse having probes 26 mounted inside and a shock circuit 28 mounted on the outside. A switch 24 energizes the shock circuit and the probes when the horse swells its neck.

Pettingill, U.S. Pat. No. 2,996,043, shows a similar collar with the circuitry mounted thereon in which the shock is delivered by the closing of a switch 28 controlled by a timer 27 to effect a time delay between the decision to shock the animal and the actual shocking.

Putnam, U.S. Pat. No. 2,741,224, shows a similar collar in which the shocking is initiated by barking of the dog, which is picked up by microphones 11 and 12 and closes a switch energizing the shocking circuit.

Peck, U.S. Pat. No. 3,753,421, shows a system in which a wire 12 is placed around the perimeter of an area and electrically energized. Within the area, an animal wears a collar which has shocking circuitry which is energized when the animal nears the wire.

Cameron et al, U.S. Pat. No. 2,800,104, and Doss, U.S. Pat. No. 3,589,337, show radio controlled shocking systems for animals.

None of the foregoing United States or Swedish patents suggest, in any manner whatsoever, a basic concept of a tension loaded switch activating a shock circuit when the pull tension on a leash exceeds a predetermined amount.

SUMMARY OF THE INVENTION

This invention relates to a device which is designed to prevent animals, such as dogs, from pulling excessively on leashes. The benefits of such a device are:

1. To prevent persons walking dogs, from being pulled by their dogs.
2. To prevent dogs from pulling excessively on chains or other "tie ups", thus damaging anchor points and to eliminate the need for heavy restraints and anchor points.
3. To prevent dogs from harming themselves by excessive pulling on leashes or tie ups.
4. To permit multiple anchor points of a simple nature permitting tying up dogs in different places to avoid damaging wear to lawn and other property.

A basic concept of this invention is that an adjustable spring loaded switch in a box mounted on the collar activates a circuit which produces an electric shock to be delivered to the animal when pull tension exceeds a preset threshold.

The shock source, preferably, is battery powered and can consist of a single pulse or multiple pulses of current of 50 or more microseconds in duration and with a current in the range of two to ten milliamperes. Electrodes consist of two blunt metal protrusions on the side of the collar opposite the pull switch shock box to insure good contact at the time of activation. The unit can be provided with a hook on the spring activated switch to accommodate a standard leash or any rope or chain.

In accordance with a preferred embodiment of the invention, a device is provided which is suitable for attachment to an animal collar, which prevents the animal from pulling excessively on the leash. The device includes a housing which is adapted for attachment to an animal collar. An electronic circuit, within the housing, is coupled to a pair of electrodes which are adapted to contact the body of the animal. The circuit provides electronic pulses to the electrodes. Means are provided for coupling the electrodes to the circuit. In addition, a power source is provided to the electronic circuit which, preferably, is a battery within the housing. The electronic circuit is suitably actuated by means including a spring loaded switch affixed to the circuit and by means external to the housing for coupling to a leash. Thus, when the spring loaded switch has a force exceeding a predetermined level exerted thereupon, electronic pulses are provided to the electrodes, thereby shocking the animal.

In accordance with certain features of the invention, the means external to the housing for coupling to a leash includes a suitable hook. The animal collar can be provided in conjunction with the box or housing, wherein the housing is affixed to one portion of the collar, and the electrodes are coupled to another portion of the collar at the interior thereof, so that the electrodes physically contact the animal when the collar is worn. In accordance with other features of the invention, the electrodes are preferably located on the collar diametrically opposite from the position where the housing is affixed, so that, the animal, when pulling on the leash, pulls in a manner such that the electrodes make a firm contact with its body.

BRIEF DESCRIPTION OF THE DRAWING

FIG. 1 is a diagrammatic view of a person walking his god, illustrating a collar, a housing, and a leash in cooperating relationship in accordance with one embodiment of this invention;

FIG. 2 is a perspective view of a collar, a shock housing, and electrodes in cooperating relationship in accordance with an embodiment of the invention;

FIG. 3 is a cross-sectional view of a housing in accordance with a specific embodiment of this invention; and FIG. 4 is an electrical diagram of a shock circuit suitable for use with an embodiment of this invention.

DESCRIPTION OF PREFERRED EMBODIMENT

Referring to FIG. 1, there is shown a person 11 walking his animal 12, such as a dog, by means of a leash 13. The person 11 carries the leash 13 one end thereof. The opposite end of the leash 13 is coupled to a housing 14 which is affixed to a dog (animal) collar 16 which is placed about the dog's (animal's) neck.

The collar 16 is illustrated as a circular loop about a dog's neck in a conventional manner. However, the term "collar" is meant to include such elements as a body harness, and is not meant to be limiting to neck worn devices solely.

Referring to FIG. 2, the collar 16 is affixed to the housing 14 by any suitable means. Though not specifically illustrated as such, the housing 14 can be fixed to the collar 16 by means of a permanent riveted connection or, alternatively, by means of a loop in the housing 14 through which the collar 16 fits therewithin. The means of connection, whether permanent of temporary, is immaterial to an understanding of this invention, and is solely a matter of specific preferences of the manufacturer and/or purchaser thereof.

In the usual fashion, the collar 16 can be adjusted by means of a plurality of notches 18 therein through which a buckle 17 engages therewith.

A plurality, preferably a pair, of electrodes 19—19 are affixed to the collar 16 so the electrodes 19—19 are oriented inwardly, as illustrated in the drawing, so that the electrodes 19—19 come into contact with the animal's neck. A pair of leads 20—20 couple the electrodes 19—19 to the housing 14. The electrodes 19—19 are blunted at their ends so as to make a good firm contact with the animal.

Within the housing 14, as depicted in FIG. 3, is a shocking circuit 22 which, in the form illustrated, can include a printed circuit board 23 having therewithin a multivibrator, driver, shock step-up transformer and other suitable circuitry. In addition, within the housing 14, is a suitable power source such as a battery 24. The battery 24 is coupled to the printed circuit board 23. The shock leads 20—20 are likewise coupled to the printed circuit board 23.

The printed circuit board 23 can include the shocking circuit 22 as indicated in the drawing at FIG. 4. The shocking circuit 22 of FIG. 4 is standard in nature and may include other types of shocking circuits; the illustrated circuit being illustrated merely to indicate a preferred mode of the invention contemplated by the inventor.

As shown in FIG. 4, the shocking circuit includes a switch 26 which is coupled, at one end, to the positive terminal of the battery 24 or other suitable power source. The other end of the switch 26 is coupled to a multivibrator circuit and driver including one ends of resistors 27, 28, 29, and 30, respectively, and to the collector 31 of a P type transistor 32. The opposite end of the resistor 27 is coupled to a collector 33 of a P type transistor 34 and is also coupled to one side of a capacitor 36. The other end of the resistor 28 is coupled to the other side of the capacitor 36 and is coupled to the base 37 of a P type transistor 38. The other end of resistor 29 is coupled to the base 39 of the transistor 34 and is also coupled to one end of a capacitor 41. The other end of the resistor 30 is coupled to the other end of the capacitor 41 and is also coupled to the collector 42 of the transistor 38. The other end of the resistor 30 is also coupled to one end of a capacitor 43. The other end of capacitor 43 is coupled to the base 44 of the transistor 32 and is also coupled to one end of a resistor 46. The emitter 47 of the transistor 32 is coupled to the primary coil 48 of a transformer 49. The opposite end of the primary coil 48 of the transformer 49 is coupled to the negative terminal of the battery 24. Likewise, the other end of the resistor 46 and the emitters 51, 52 of the transistors 34 and 38, respectively, are also coupled to the negative end of the battery 24. The output of the shocking circuit 22 is obtained from the secondary coil 53 of the transformer 49.

In use, the housing 14 is made a part of the belt or dog collar 16, the housing 14 being either riveted or otherwise affixed to the dog collar 16. The overall combination, including the housing 16, the electrodes 19—19, and the accompanying leads 20—20, is affixed about the animal's neck by means of the buckle 17 and the notches 18—18 of the dog collar. Upon being worn, the overall device is affixed to a chain or leash 13 by means of a leash hook 54 which forms a portion of the spring actuated switch 26. In normal operation, the circuit 22 is not energized, and the dog or animal is held lightly by the leash or chain 13. When the animal pulls excessively beyond a certain point, in terms of force, the leash hook 54 pulls the switch 26 against a compression spring 56 and actuates the switch 26 as to close and activate the shocking circuit 22. Pulses of energy are applied to the dog's neck by way of the electrodes 19—19, thus shocking the dog. The dog, thereafter, refrains from excessive pulling, and whereupon the shocks cease.

The amount of spring tension applied by the leash 13 prior to closing of the switch can be adjusted by a tension adjustnut 57 which varies the amount of tension on the spring 56.

Mechanically, there are various concepts in which this invention can be applied. The box-like housing 14 can be attached to the collar 16 by any one of several means. The housing 14 can be riveted directly to the collar 16 or, alternatively, it can be coupled by means of belt loops or some similar device through which the collar slips, as indicated above. The shock electrodes 19—19 are brought out of the housing 14 and can be either fed by leads 20—20 through the collar 16 and brought out at the electrode point on the underside of the dog's neck, or the wires 20—20 can be wrapped around the collar 16 as is common with other types of shocking collars known in the art, whereby the wires 20—20 are attached to the electrodes 19—19 which are mounted on the collar 16 on the opposite side of the housing 14. The housing 14 itself is on the operator's end and has an eye hook 54 coming through the housing 14. The eyehook 54, desirably, accommodates any commercially available leash. The eye-hook is attached to the spring switch mechanism 56-26 and, as the leash 13 tension increases, either by the operator pulling or the animal pulling, the shocking circuit 22 is actuated as the spring 56 is engaged.

In a preferred mode contemplated by the inventor, it is desired that belt loops be used for coupling the housing 14 to the collar 16 because, commercially, the option exists with the manufacturer to either sell the shocking device housing 14 with or without a collar.

It may be desirable, from a manufacturer's viewpoint, to provide the electrodes 19—19 in close association with the shock housing 14. In such an event, the electrodes 19—19 could be spring loaded within the housing 14 so that tension upon the leashhook 54 or leash 13 could cause the electrodes to be forced down into the box and thus actuate the circuit and also be the mode of delivery of the shock. Disadvantageously, however, in such an event, such electrodes would be floating, electrically, and a problem would exist where the dog could swallow or bend its neck to increase the neck diameter, thus depressing the electrodes and, when swallowing, deliver a shock when he is not pulling, thus providing for a behavioral disadvantage.

In providing shocks to the animal, there are many parameters to be considered: the voltage, the current and the pulse characteristics. By way of example, the pulse characteristics can be in a range of ten to twenty-five pulses per second, with narrow spikes in the microsecond to millisecond range. It is desired to deliver an adequate or sufficiently aversive stimulus without an undue consumption of electric power; however, it is believed that pulse durations in excess of 500 microseconds does not increase the aversiveness of stimuli to animals. At high voltages, and at relatively high currents, extensive pulses tend to do tissue damage to the animals, and would not otherwise increase the adverse stimuli derived.

Each successive pulse can be of the same polarity or of opposite polarity, and, in one form of pulse circuit, can provide a large positive pulse followed by a small negative one. The pulses can be inductively coupled, with minimum kickback, thus providing for a ten to one bipolar pulse.

It is preferred that the pulses do not exceed 25 pulses per second. With such limitation, a stimulus is provided for the maximum amount of muscle fiber activation on the animal for each pulse, thus the total energy requirements to the animal are efficiently minimized.

Muscle fiber stimulation is what causes the primary aversiveness in a shock that causes the pulsing contraction in animal. The aversiveness of a shock is determined by either one of two things: either burning or puncturing of the skin which stimulates cutaneous nerve fibers, or, in a gross or overall effect, the stimulation of muscle fibers causing a complete contraction. An effective range of frequencies is between ten to twenty-five pulses per second, with some leeway for variance. The optimum duration is believed to be 13 pulses per second for mammalian species.

It is noted that there is no expenditure of stand-by current when the circuit is not actuated by the excessive pulling of the animal.

It is known, in the past, to use dog collars in radio controlled shockers, batteries, multi-vibrators, leashes and the like. However, it is to be noted that the basic concept of a tension loaded switch activating a shocking circuit when the pull tension on the leash exceeds a predetermined amount is believed to be new. Hence, it is the intention of the applicant that such concept be considered to be his invention and that the claims be construed as broadly as possible to cover such concept. As stated above, the term "collar" includes a harness and other body-encircling members.

What is claimed is:

1. A device, suitable for attachment to an animal collar, for automatically preventing the animal from pulling excessively on a leash, comprising
  a. a housing adapted for attachment to an animal collar;
  b. a pair of electrodes adapted to contact the body of an animal;
  c. an electronic circuit, housed within said housing, and coupled to said electrodes, for providing electronic pulses to said electrodes;
  d. means for coupling said electrodes to said circuit;
  e. means for providing a power source to said electronic circuit; and
  f. means for actuating said electronic circuit including a spring loaded switch affixed to said circuit and including means external to said housing for coupling to a leash, whereby, when said spring loaded switch has a force exerted thereupon, exceeding a predetermined lightly applied force, electronic pulses are provided to said electrodes.

2. The device as recited in claim 1 wherein said means for providing a power source includes a battery within said housing.

3. The device as recited in claim 1 wherein said means external to said housing for coupling to a leash includes a hook.

4. The device as recited in claim 1 further comprising an animal collar, and wherein said housing is affixed to one portion of said collar, and said electrodes are coupled to another portion of said collar at an interior portion thereof so that said electrodes physically contact the animal when said collar is worn.

5. The device as recited in claim 4 wherein said means for providing a power source includes a battery within said housing.

6. The device as recited in claim 4 wherein said means external to said housing for coupling to a leash includes a hook.

7. The device as recited in claim 4 wherein said electrodes are located on said collar diametrically opposite from said housing, whereby said animal, when pulling on a leash, pulls in a manner such that said electrodes make a firm contact with the body of said animal.

* * * * *